(12) United States Patent
Magno (10) Patent No.: US 9,196,978 B2
(45) Date of Patent: Nov. 24, 2015

(54) GROUNDING AND BONDING BRACKET (71) Applicant: Thomas & Betts International, LLC, Wilmington, DE (US)

(72) Inventor: Joey D. Magno, Cordova, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 51 days.

(21) Appl. No.: 14/264,535

(22) Filed: Apr. 29, 2014

(65) Prior Publication Data
US 2014/0329420 A1  Nov. 6, 2014

Related U.S. Application Data (60) Provisional application No. 61/819,140, filed on May 3, 2013.

(51) Int. Cl.
| H01R 4/66 | (2006.01) |
| H01R 11/26 | (2006.01) |
| H01R 4/36 | (2006.01) |
| H02G 3/32 | (2006.01) |

(52) U.S. Cl.
CPC .............. *H01R 11/26* (2013.01); *H01R 4/36* (2013.01); *H02G 3/32* (2013.01)

(58) Field of Classification Search
CPC .......... H01R 12/00; H01R 3/60; H01R 11/26; E04B 2/82
USPC ...................... 439/803, 801, 92, 97
See application file for complete search history.

(56) References Cited

U.S. PATENT DOCUMENTS

| 3,594,703 | A | | 7/1971 | Holtzapple |
| 3,720,778 | A | | 3/1973 | Woertz et al. |
| 3,848,955 | A | | 11/1974 | Lockie et al. |
| 4,240,687 | A | | 12/1980 | Bunnell et al. |
| 4,925,395 | A | * | 5/1990 | Franks, Jr. ............... 439/100 |
| D364,792 | S | * | 12/1995 | Yoder et al. ............... D8/72 |
| 6,210,206 | B1 | | 4/2001 | Durham |
| 6,402,544 | B1 | | 6/2002 | Barnett |
| 6,699,062 | B1 | | 3/2004 | Barnett et al. |
| 6,976,857 | B1 | * | 12/2005 | Shukla et al. ............ 439/100 |
| 7,406,800 | B2 | | 8/2008 | Cinnamon et al. |
| 7,592,537 | B1 | | 9/2009 | West |
| 7,832,157 | B2 | | 11/2010 | Cinnamon |
| 7,862,390 | B2 | * | 1/2011 | Copper ...................... 439/781 |
| 7,866,098 | B2 | | 1/2011 | Cinnamon |

(Continued)

OTHER PUBLICATIONS

Kyocera Solar, Inc., Installation Manual For Kyocera PV Modules, date published is Sep. 10, 2012, Scottsdale, AZ, USA.

(Continued)

*Primary Examiner* — Abdullah Riyami
*Assistant Examiner* — Nader J Alhawamdeh
(74) *Attorney, Agent, or Firm* — Butler Snow LLP (57) ABSTRACT

An improved grounding and bonding bracket-type electrical connector is described with improved properties for directionally orienting grounding conductors. The electrical connector has a body with a first and a second clamp area. The second clamp area may be partially formed by a second body member. A frame substrate is connected in the first clamp area, while a grounding conductor is connected in the second clamp area. The grounding conductor may be connected such that the path of the conductor runs parallel, at 45 degrees, or perpendicular as compared to the mounting line of the frame substrate.

26 Claims, 8 Drawing Sheets

(56) References Cited

U.S. PATENT DOCUMENTS

| | | | |
|---|---|---|---|
| 7,946,862 B2 * | 5/2011 | Schluter | 439/100 |
| 7,987,641 B2 | 8/2011 | Cinnamon | |
| 8,002,573 B2 | 8/2011 | Elsaesser et al. | |
| 8,021,169 B1 * | 9/2011 | Smith | 439/100 |
| 8,191,320 B2 | 6/2012 | Mittan et al. | |
| 9,038,329 B2 * | 5/2015 | Pelman et al. | 52/173.3 |
| 2008/0057776 A1 * | 3/2008 | Cummings | 439/382 |
| 2009/0139156 A1 * | 6/2009 | Magno et al. | 52/127.9 |
| 2011/0318975 A1 * | 12/2011 | Giefers et al. | 439/818 |
| 2012/0222718 A1 | 9/2012 | Sweeney | |
| 2014/0329420 A1 * | 11/2014 | Magno | 439/803 |

OTHER PUBLICATIONS

Legrand, Cablofil Two Rail Systems—Cable Tray Grounding Clamps website, known to Applicant and date captured / printed Apr. 11, 2013, date published is unknown, Internet published.

Cooper Crouse-Hinds, Crouse-Hinds Industrial Products Catalog at p. 108, known to Applicant and date captured / printed Apr. 11, 2013, copyright date of 2009 is listed for webpage, date published is unknown, Internet published.

Kendall Electric Inc., TCGC Appleton Cable Tray Ground Clamp 78138154174 website, known to Applicant and date captured / printed Apr. 11, 2013, copyright date of 2013 is listed for webpage, date published is unknown, Internet published.

United Structural Products, Ground Wire Clamp, date published is Apr. 28, 2011, Atlanta, GA, USA.

MP Husky, MP Husky catalog at Accessories, Splices and Connectors section pp. 137-146, known to Applicant and date captured / printed Apr. 11, 2013, copyright date of 2010 is listed for catalog, date published is unknown, city where published is unknown.

Thomas & Betts Corporation, Fittings and Electrical Raceways catalog at Cable Tray Grounding Clamps on p. 42, known to Applicant and date captured / printed Apr. 11, 2013, date published is unknown, printed in USA.

Sharp Electronics Corp., Solar Energy Solutions Group, Sharp Photovoltaic (PV) Module Alternate Grounding Addendum, date published is Apr. 12, 2012, Camas, WA, USA.

Ball, G., Grounding Photovoltaic Modules: The Lay of the Land, Published by Solar America Board for Codes and Standards, date published is Mar. 2011, city of publication is unknown, published in USA.

* cited by examiner

GROUNDING AND BONDING BRACKET

CROSS-REFERENCES TO RELATED APPLICATIONS

This application claims the benefit of U.S. Provisional Application No. 61/819,140, filed May 3, 2013, which is incorporated herein by reference in its entirety.

FIELD OF THE INVENTION

The present invention is generally directed toward grounding and bonding bracket-type electrical connectors for use with PV modules or cable trays having improved properties for directional placement of associated grounding conductors.

BACKGROUND OF THE INVENTION

Photovoltaic ("PV") modules, commonly referred to as solar panels, within PV systems/arrays and cable tray components within a cable tray system must be grounded under various electrical codes, e.g., the National Electric Code (NEC), CSA Group, Canadian Electric Code (CEC), and International Electrotechnical Commission (IEC). Electrical connectors are commonly used in PV system and cable tray system applications to mechanically bond and ground individual components within these systems. Many options are available for electrical connectors in PV systems, such as grounding lugs; grounding straps; lay-in lugs; Washer, Electrical Equipment Bonding ("WEEB") clips; and grounding brackets. Installation of lugs and brackets requires that the anodizing of the PV module be removed in order to achieve electrical connectivity. Although this may be accomplished by star or lock washers, anodizing coating thicknesses vary, and time consuming practices, i.e., grinding or sanding, are often required to ensure electrical connectivity. Lugs also require the installer to disassemble and reassemble the connector bolt, nut, and washers. Installation of WEEB clips (used to bond PV frames to PV mounting racks) requires a particular torque value to ensure proper electrical connectivity by their embossed circular protrusions. However, there are some PV modules on the market that cannot meet the torque requirement, and these PV module frames will collapse before penetration of the anodizing coating by the embossed protrusions.

Cable tray system components may be bare conductive metal or coated (paint, galvanized, anodized, etc.). Coated cable tray systems require installation of electrical connectors, such as grounding lugs, grounding straps, lay-in lugs, or bracket clamps, which are mechanically bonded to the cable tray components within the cable tray system. The same time consuming process of removing the coating and disassembly/reassembly of bolts/washers can be required for installing these devices in cable tray systems. Furthermore, a disadvantage for all known electrical connectors is that each requires the ground conductor to be run parallel to the frame or frame edge on which it is attached.

SUMMARY OF THE INVENTION

Bracket-type electrical connector clamps comprising two clamping areas for mechanically bonding PV modules within a PV system or cable tray components within a cable tray system are provided. Some embodiments comprise knurled tip fasteners that obviate the need for time consuming removal of protective coatings from PV module frames, mounting racks, and mounting frame, from cable tray components, or from grounding conductors. Some embodiments have a fixed angle construction where the clamping areas cause the connected frame and grounding conductor to form lines approximately perpendicular to one another. In other embodiments, a two-piece design allows for the grounding conductor clamping area to be differentially oriented to allow for lines that are approximately parallel, at a 45° angle, or perpendicular to the connected frame.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

In one aspect, the present invention provides an electrical connector 10 for electrically connecting a frame substrate (e.g., the frame of a PV module 40, the mounting rack for a PV module 40, or the mounting frame of a plurality of PV modules 40) to a grounding conductor 50. The electrical connector 10 of the present invention may also be used for electrically connecting other frame substrates (e.g., cable tray components in a cable tray system) to a grounding conductor 50. In preferred embodiments, the present invention is used for electrically connecting PV modules 40 to a grounding conductor 50. The electrical connector body 1 of the present invention may be manufactured by any known or acceptable method(s), e.g., by sheet or plate metal stamping, die casting, extrusion, and/or machining In some embodiments, the electrical connector body 1 is formed by die casting methods and/or a combination of extrusion and machining methods. In preferred embodiments, the electrical connector body 1 is formed by a combination of extrusion and machining methods.

The electrical connector body 1 of the present invention can be formed from any sturdy and conductive material. In some embodiments, the electrical connector body 1 is formed from aluminum, electrically conductive aluminum alloys, tin-plated copper, or a tin-plated electrically conductive copper alloy. In preferred embodiments, the electrical connector body 1 is formed from aluminum or electrically conductive aluminum alloys.

The shape of the electrical connector body 1 of the present invention may take any form that allows for mechanical clamping (i.e., bonding) of the substrates to be mechanically clamped (e.g., a PV module 40 frame, mounting rack, or mounting frame, cable tray component, and grounding conductor 50) with associated fasteners and also allows for directionally orienting the substrates approximately perpendicular to one another.

The clamp areas 2, 3 of the present invention are formed during the above described manufacturing process(es). The interior of the clamp areas of the present invention should be designed to have openings 20, 30 large enough to adequately contact and hold the substrate being mechanically clamped (i.e., a PV module frame, mounting rack, or mounting frame, and grounding conductor 50), but not too large such that wasted material is used in constructing the electrical connector body 1. Furthermore, the interior of the clamp areas of the present invention may be designed to comprise finished surfaces that are smooth 35 or contain serrations or spike(s) 25 on the side opposite the associated fastener. Serrations and spike(s) 25 can be advantageous in electrical connector design by aiding in gripping the frame substrate being mechanically clamped, or, especially in the case of a spiked surface, for penetrating protective coverings (e.g., insulation) or other coatings (e.g., corrosion) of grounding conductors 50. In some embodiments, the clamp areas of the present invention have smooth surfaces 35 in both clamp area interiors. In other embodiments, the clamp areas of the present invention have a spiked surface in the grounding conductor clamping area interior and a serrated surface 25 in the frame clamping area interior. In preferred embodiments, the clamp areas of the present invention have a smooth surface 35 in the grounding conductor clamping area interior and a serrated surface 25 in the frame clamping area.

Any known or acceptable fastener(s) may be employed in the clamp areas 2, 3 of the present invention for mechanically bonding the PV modules 40 and/or grounding conductor 50. The fasteners of the present invention may be formed from any acceptable sturdy and conductive material, e.g., stainless steel, aluminum, electrically conductive aluminum alloys, tin-plated copper, or tin-plated electrically conductive copper alloys. In some embodiments, the fasteners are threadably coupled to the electrical connector body 1. In preferred embodiments, the threadably coupled fasteners are set screws, bolts, cutting screws, or similar devices. In still further preferred embodiments, the threadably coupled fasteners are set screws. In yet further preferred embodiments, at least one of the threadably coupled fasteners (especially the frame clamp area associated fastener) of the present invention is a stainless steel set screw 33 with a knurled tip 34.

In another aspect, the present invention provides an electrical connector 100 for electrically connecting frame substrates (e.g., cable tray components in cable tray systems or the frame of PV modules 40, the mounting rack for a PV module 40, or the mounting frame of a plurality of PV modules 40 in a PV system) to a grounding conductor 50. In preferred embodiments, the present invention is used for electrically connecting frame substrates of cable tray components to a grounding conductor 50. The electrical connector body 101 and cable clamp body 160 of the present invention may be manufactured by any known or acceptable method(s), e.g., by sheet or plate metal stamping, die casting, extrusion, and/or machining In some embodiments, the electrical connector body 101 is formed by die casting methods and/or a combination of extrusion and machining methods. In preferred embodiments, the electrical connector body 101 is formed by a combination of extrusion and machining methods. In some embodiments, the cable clamp body 160 is formed by die casting methods and/or a combination of extrusion and machining methods. In preferred embodiments, the cable clamp body 160 is formed by a combination of extrusion and machining methods.

The electrical connector body 101 of the present invention can be formed from any sturdy and conductive material. In some embodiments, the electrical connector body 101 is formed from aluminum, electrically conductive aluminum alloys, tin-plated copper, or tin-plated electrically conductive copper alloys. In preferred embodiments, the electrical connector body 101 is formed from aluminum or electrically conductive aluminum alloys.

The cable clamp body 160 of the present invention can be formed from any sturdy and conductive material. In some embodiments, the cable clamp body 160 is formed from aluminum, electrically conductive aluminum alloys, tin-plated copper, or tin-plated electrically conductive copper alloys. In preferred embodiments, the cable clamp body 160 is formed from aluminum or electrically conductive aluminum alloys.

The shape(s) of the electrical connector body 101 and the cable clamp body 160 of the present invention may take any form(s) that allow for mechanical clamping (i.e., bonding) of the substrates to be mechanically clamped (e.g., cable tray component(s) and grounding conductor 50) with associated fasteners and also allow for directionally orienting the substrates in one of a plurality of orientations about an axis defined by the cable clamp area fastener. To that end, in some embodiments the electrical connector body cable clamp area portion 103a of the electrical connector body 101 of the present invention is designed to have a plurality of faces to physically engage lips on at least two of the sides of the cable clamp body 160 in order to ensure the orientation of the substrates to be clamped does not substantially deviate from its original orientation. In some embodiments, the orientation of the substrates to be mechanically clamped is an angle between 0-180°, inclusive, to one another. In still further embodiments, the orientation of the substrates to be mechanically clamped is approximately perpendicular, approximately parallel, or approximately at a 45° angle to one another. In preferred embodiments, the orientation of the substrates to be mechanically clamped is approximately perpendicular or approximately parallel to one another.

The clamp areas 102, 103b of the present invention are formed during the above described manufacturing process (es). The interior of the clamp areas, especially that of the frame clamping area opening 120, of the present invention should be designed to have an opening large enough to adequately contact and hold the frame substrate being mechanically clamped (e.g., cable tray component(s) or PV module(s) 40 and grounding conductor 50), but not too large such that wasted material is used in constructing the electrical connector body 101. Furthermore, the interior of the clamp areas of the present invention may be designed to comprise finished surfaces that are smooth 135 or contain serrations or spike(s) 125 on the side opposite the associated fastener. Serrations and spike(s) 125 can be advantageous in electrical connector design by aiding in gripping the substrate being mechanically clamped, or, especially in the case of a spiked surface, for penetrating protective coverings (e.g., insulation) or other coatings (e.g., corrosion) of grounding conductors 50. In some embodiments, the clamp areas of the present invention have smooth surfaces 135 in both clamp area interiors. In other embodiments, the clamp areas of the present invention have a spiked surface in the grounding conductor clamping area interior and a serrated surface 125 in the frame clamping area interior. In preferred embodiments, the clamp areas of the present invention have a smooth surface 135 in the electrical connector body cable clamp area portion 103a and cable clamp area 103b interior and a serrated surface 125 in the frame clamping area 102.

Any known or acceptable fastener(s) may be employed in the clamp areas of the present invention for mechanically bonding the cable tray component(s) and/or grounding conductor 50. The fasteners of the present invention may be formed from any acceptable sturdy and conductive material, e.g., stainless steel, aluminum, electrically conductive aluminum alloys, tin-plated copper, or tin-plated electrically conductive copper alloys. In some embodiments, the fasteners are threadably coupled to the electrical connector body 101. In preferred embodiments, the threadably coupled fasteners are set screws, bolts, cutting screws, or similar devices. In still further preferred embodiments, the threadably coupled fasteners are set screws or bolts. In yet further preferred embodiments, at least one of the threadably coupled fasteners (especially the frame clamp area associated fastener) of the present invention is a stainless steel set screw or hex bolt 133 with a knurled tip 134.

Figure 1:
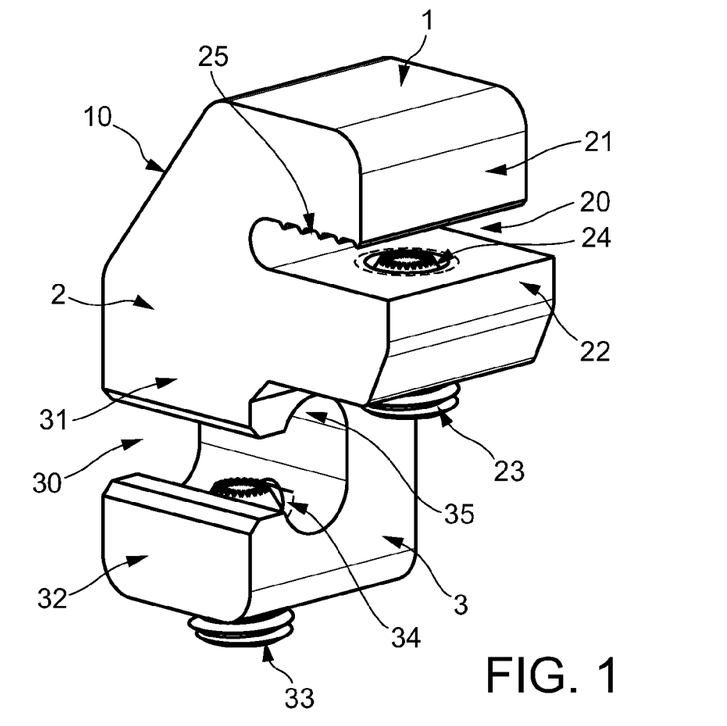
FIG. 1 is a perspective view of one embodiment of a PV system or cable tray system electrical connector with opening areas for engaging a frame substrate and a grounding conductor substrate.

Referring now to the drawings, FIG. 1 illustrates one embodiment of the electrical connector 10 of the present invention. The electrical connector 10 comprises a one piece electrical connector body 1 preferably formed from extruded aluminum or a conductive aluminum alloy. The electrical connector body 1 of this embodiment is extruded to form one of two clamp areas (the frame clamp area 2 in this embodiment) and machined to form the other clamp area (the grounding conductor clamp area 3 in this embodiment). Each clamp area 2, 3 is machined to form threaded holes 28, 38 for threadably coupled fasteners 23, 33, respectively.

The frame clamp area 2 comprises a frame clamp area opening 20 (defined by an upper arm 21 and lower arm 22), associated frame clamp area fastener 23 (a hex drive stainless steel set screw with knurled tip 24 in this embodiment, but flat point tip set screws may also be used, especially if the framing substrate has no protective coating or the coating has or will be removed at the mounting location), and serrated surface 25 on the interior of the frame clamp area opening 20 opposite from the side of the associated knurled tip 24 frame clamp area fastener 23. A flat panel aluminum frame of a PV module 40 (or other suitable frame substrate to be clamped, e.g., a cable tray component) can be inserted into the frame clamp area opening 20 of the frame clamp area 2, in which it will be mechanically bonded to the electrical connector 10 by engaging the associated frame clamp area fastener 23. The serrated interior surface 25 of frame clamp area opening 20 serves at least two purposes in this embodiment. First, the serrations aid in holding the electrical connector 10 to the frame substrate prior to mechanical bonding. Second, the serrations may penetrate any protective coating (typically an anodized coating on the aluminum frames of PV modules 40, mounting racks, and mounting frames, and typically paint, galvanized coating, or similar on cable tray components) of the frame substrate during mechanical bonding. Furthermore, the knurled tip 24 of the associated frame clamp area fastener 23 penetrates into any protective coating of the frame substrate during mechanical bonding and aids in holding the frame substrate securely in various environmental conditions.

The grounding conductor clamp area 3 comprises a grounding conductor clamp area opening 30 (defined by an upper arm 31 and lower arm 32), associated grounding conductor clamp area fastener 33 (a hex drive stainless steel set screw with knurled tip 34 in this embodiment, but flat point tip set screws may also be used, especially if the grounding conductor 50 has no protective coating or the coating has or will be removed at the connecting location), and smooth surface 35 on the interior of the grounding conductor clamp area opening 30 opposite from the side of the associated knurled tip 34 grounding conductor clamp area fastener 33. A grounding conductor 50 (typically a bare copper or conductive copper alloy wire) can be inserted into the grounding conductor clamp area opening 30 of the grounding conductor clamp area 3, in which it will be mechanically bonded to the electrical connector 10 by engaging the associated grounding conductor clamp area fastener 33.

Figure 2:
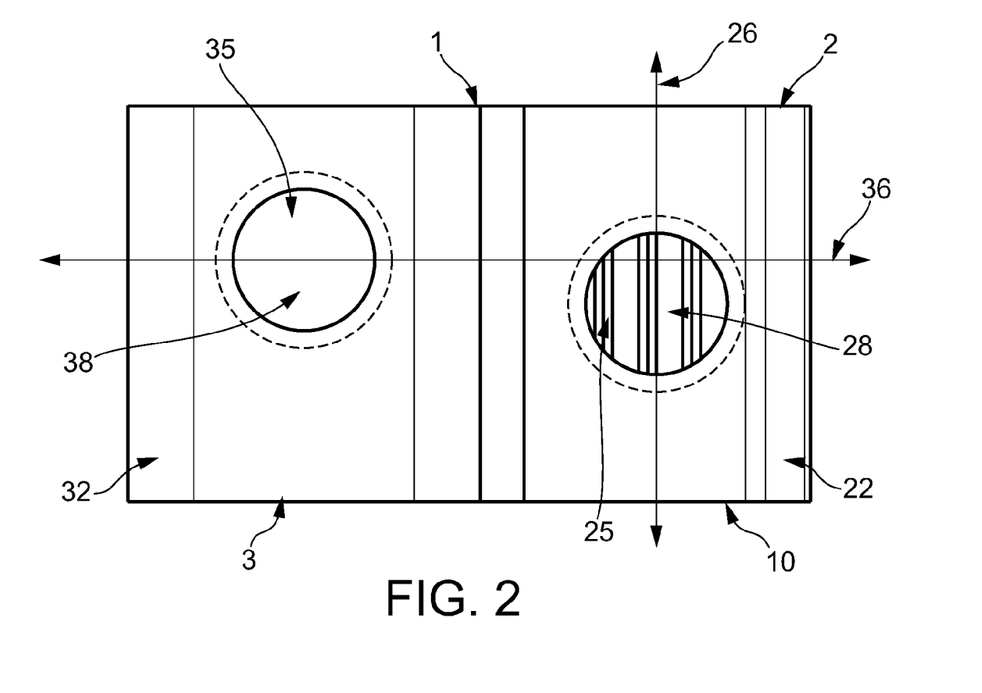
FIG. 2 illustrates the perpendicular orientation feature of the embodiment shown in FIG. 1 of the present invention.

The frame clamp area opening 20 and grounding conductor area opening 30 are positioned on the electrical connector body 1 such that a line defined by a frame substrate 26 and a line defined by a grounding conductor 36 are approximately perpendicular to one another. This can be further visualized in FIG. 2.

Figures 3A, 3B:
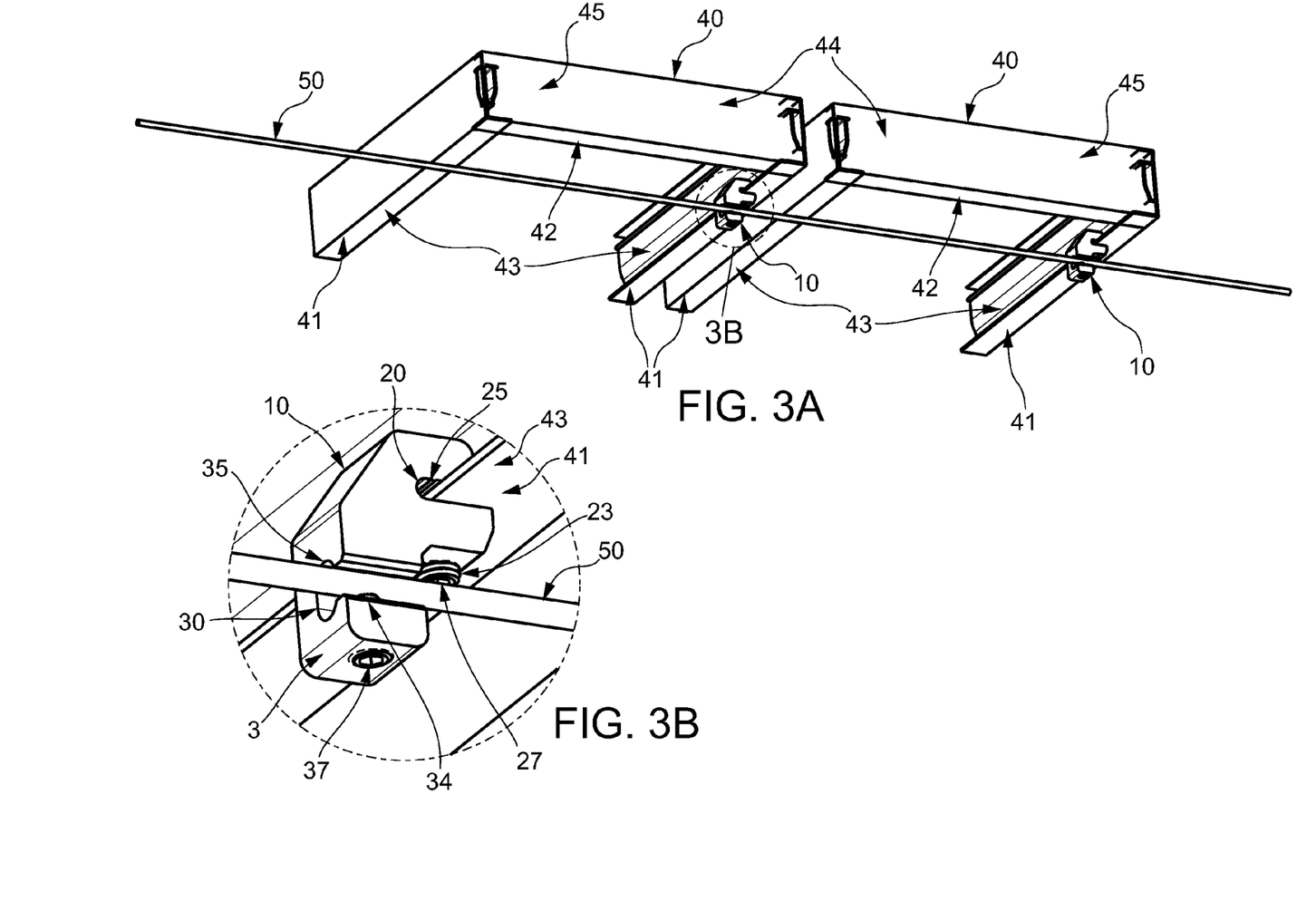
FIG. 3A depicts an embodiment of the present invention bonding and grounding frame substrates (PV module long arm frames) with the grounding conductor 50 running perpendicular to the long arm frame.
FIG. 3B is a detail area close up from FIG. 3A.

FIG. 3 illustrates an embodiment of the present invention in which two PV modules 40 in a PV system/array are bonded and grounded by electrical connectors 10 electrically connected to a grounding conductor 50. PV modules 40 comprise an anodized aluminum frame 45 having a short side 44 and a long side 43. The short side 44 has short side flat plate frame member 42, and the long side 43 has long side flat plate frame member 41. The electrical connectors 10 of the present invention may be mechanically bonded and grounded to either the short side 44 on short side flat plate frame member 42 or on long side 43 on long side flat plate frame member 41. The associated frame clamp area fastener 23 with hex drive 27 is engaging the long side flat plate frame member 41 to form a mechanical bond. The associated grounding conductor area fastener 33 with hex drive 37 is engaging the grounding conductor 50 at knurled tip 34 to form a mechanical bond. Note that the long side flat plate frame member 41 and grounding conductor 50 are oriented such that these are approximately perpendicular to one another.

FIGS. 4-8 illustrate other embodiments of the electrical connector 100 of the present invention. The electrical connector 100 comprises a one piece electrical connector body 101 preferably formed from extruded aluminum, a conductive aluminum alloy, tin-plated copper, or a tin-plated conductive copper alloy. The electrical connector body 101 of this embodiment is extruded to form the frame clamp area 102 and the electrical connector body cable clamp area portion 103a of the multidirectional grounding conductor clamp area 103b formed by coupling the cable clamp body 160 to the electrical connector body cable clamp area portion 103a. Each component 103a, 122, 160 of the clamp areas 102, 103b is machined to form threaded holes 128, 138 for threadably coupled fasteners 123, 133, respectively.

Figure 4A:
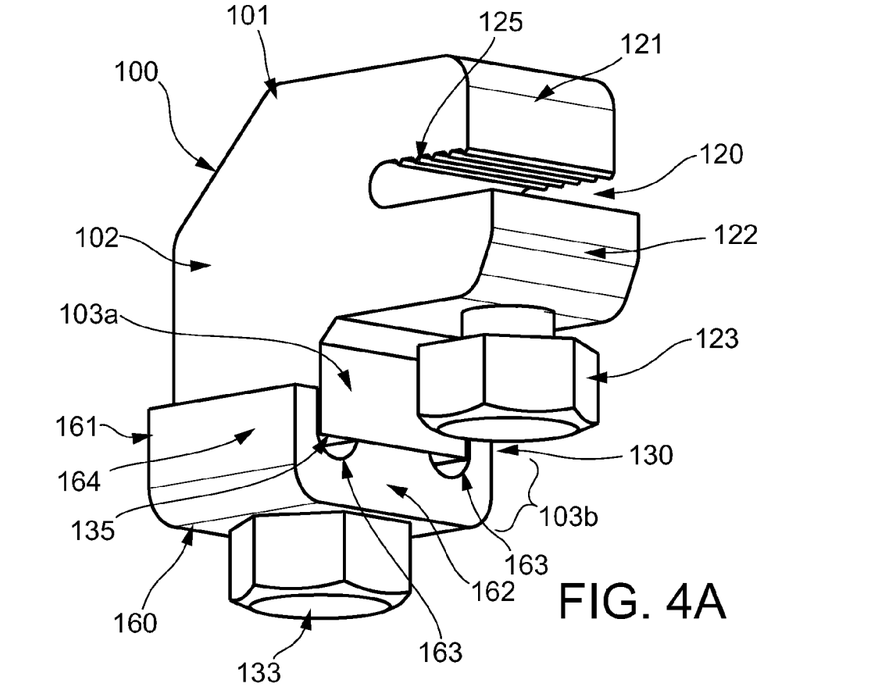
FIG. 4A is a perspective view of a two-piece embodiment of a PV system or cable tray system electrical connector with an opening area for engaging a frame substrate and a second opening area for directionally orienting a grounding conductor substrate.

The frame clamp area 102 comprises a frame clamp area opening 120 (defined by an upper arm 121 and a lower arm 122), associated frame clamp area fastener 123 (a stainless steel hex bolt with knurled tip 124 in this embodiment, but flat point tip fastener may also be used, especially if the framing substrate has no protective coating or the coating has or will be removed at the mounting location), and serrated surface 125 on the interior of the frame clamp area opening 120 opposite from the side of the associated knurled tip 124 frame clamp area fastener 123. A cable tray component frame substrate (or other suitable frame substrate to be clamped, e.g., a flat panel aluminum frame of a PV module 40) can be inserted into the frame clamp area opening 120 of the frame clamp area 102, in which it will be mechanically bonded to the electrical connector 100 by engaging the associated frame clamp area fastener 123. The serrated interior surface 125 of frame clamp area opening 120 serves at least two purposes in this embodiment. First, the serrations aid in holding the electrical connector 100 to the frame substrate prior to mechanical bonding. Second, the serrations may penetrate any protective coating (typically an anodized coating on the aluminum frames of PV modules 40, mounting racks, and mounting frames, and typically paint, galvanized coating, or similar on cable tray components) of the frame substrate during mechanical bonding. Furthermore, the knurled tip 124 of the associated frame clamp area fastener 123 penetrates into any protective coating of the frame substrate during mechanical bonding and aids in holding the frame substrate securely in various environmental conditions.

The cable clamp area 103b comprises a cable clamp area opening 130 (defined by an electrical connector body cable clamp area portion 103a and cable clamp body 160), associated cable clamp area fastener 133 (a stainless steel hex bolt in this embodiment with knurled tip, as shown in FIG. 8, but flat point tip fasteners may also be used, especially if the grounding conductor has no protective coating or the coating has or will be removed at the connecting location), and smooth surface 135 on the upper cable clamp area opening 130 opposite from the side of the associated cable clamp area fastener 133. A grounding conductor 50 (typically a bare copper or conductive copper alloy wire) can be inserted into the cable clamp area opening 130 of the cable clamp area 103b, in which it will be mechanically bonded to the electrical connector 100 by engaging the associated grounding conductor clamp area fastener 133.

Figure 4B:
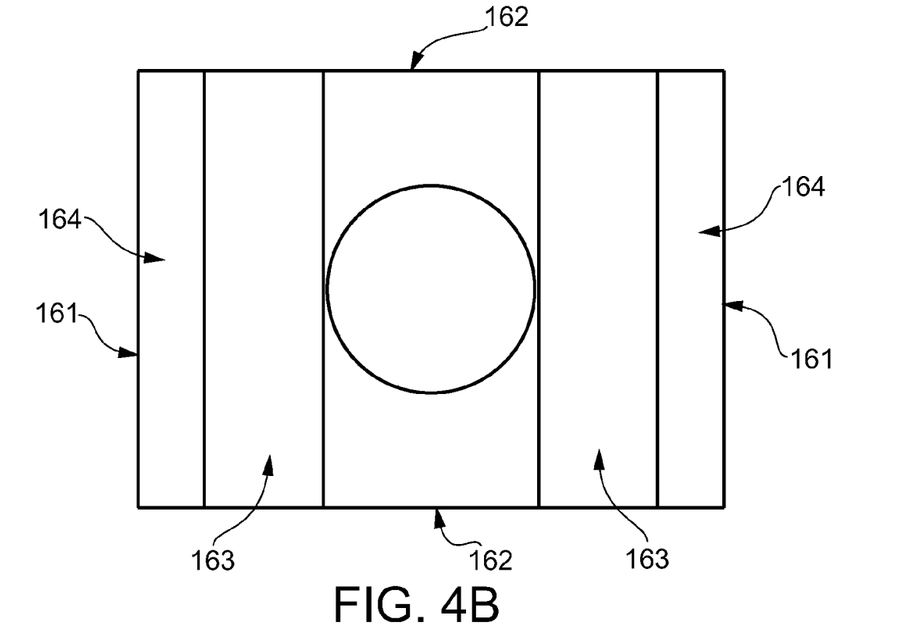
FIGS. 4B and 4C are top and side views, respectively, of the cable clamp body of a two-piece embodiment of the present invention.
Figure 4C:
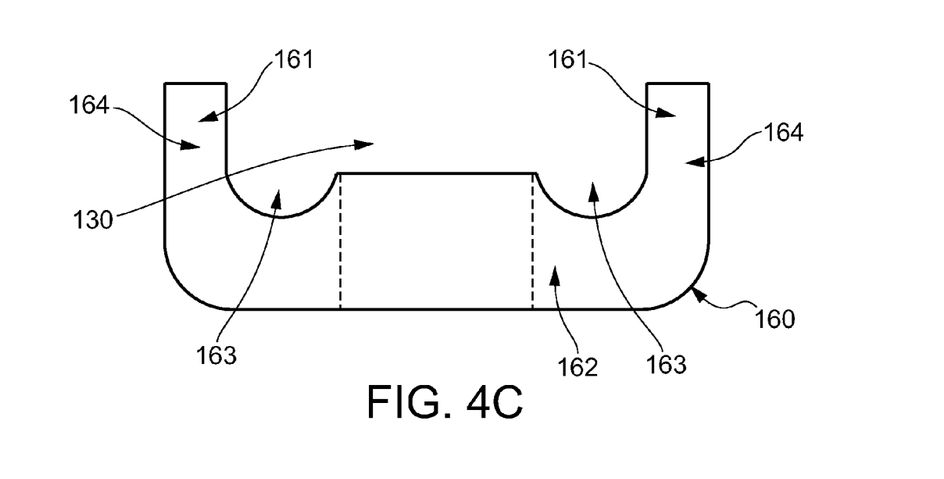

The cable clamp body 160 of this embodiment has two parallel oriented directional cable grooves 163 for seating one or more grounding conductors 50 in cable clamp area opening 130.

Figure 5:
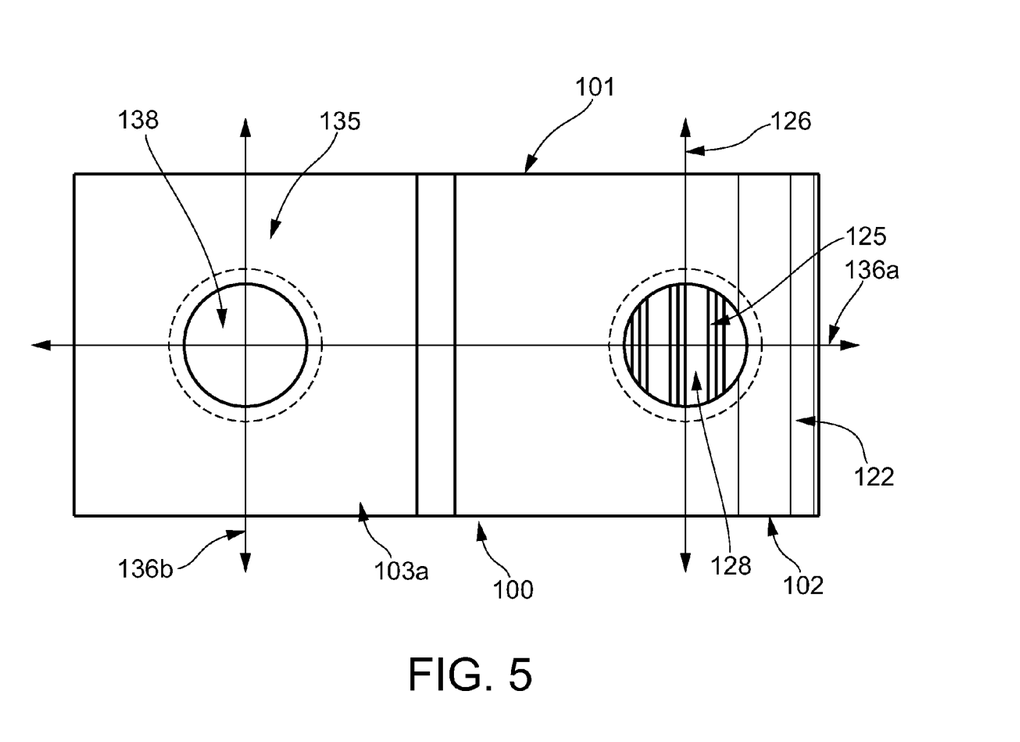
FIG. 5 illustrates the directional orientation feature of a two-piece embodiment of the present invention.
Figure 6A:
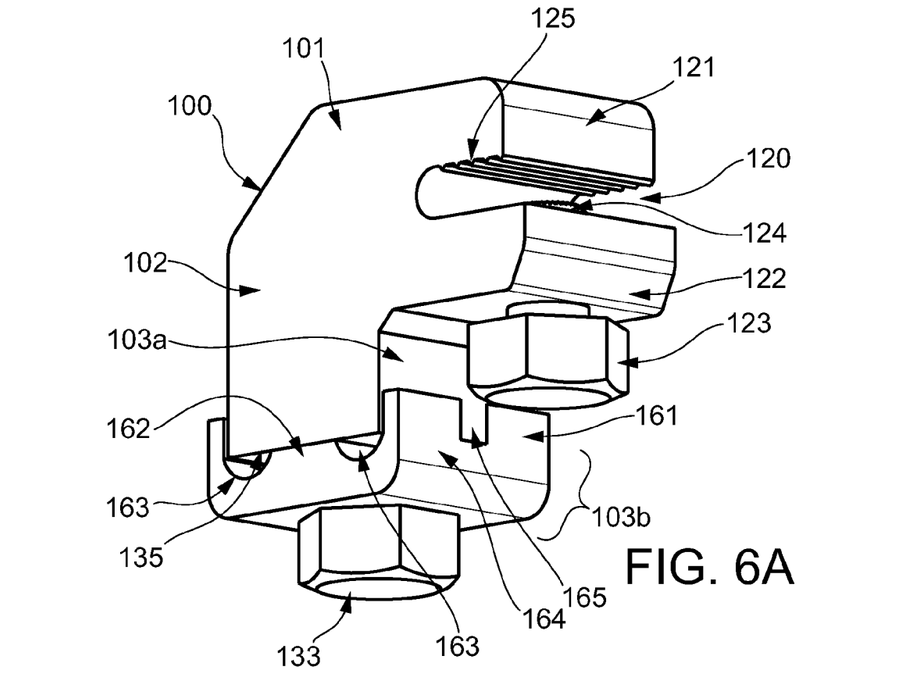
FIGS. 6A and 6B are perspective views of a two-piece embodiment of a PV system or cable tray system electrical connector with an opening area for engaging a frame substrate and a second opening area capable of directionally orienting a grounding conductor substrate approximately at a 45° angle, parallel, or perpendicular to the frame substrate edge.
Figure 6B:
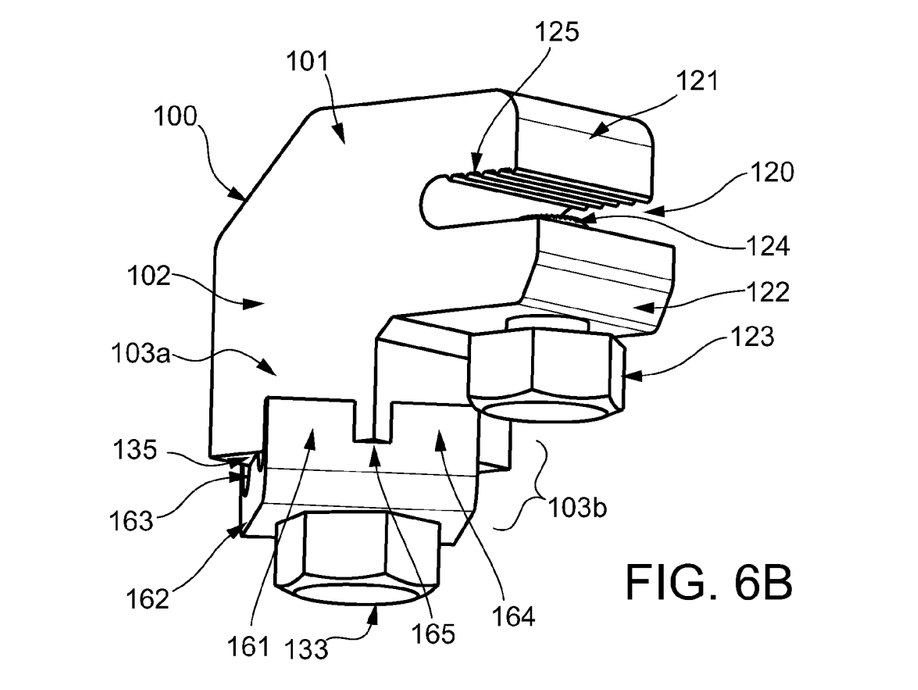
Figure 6C:
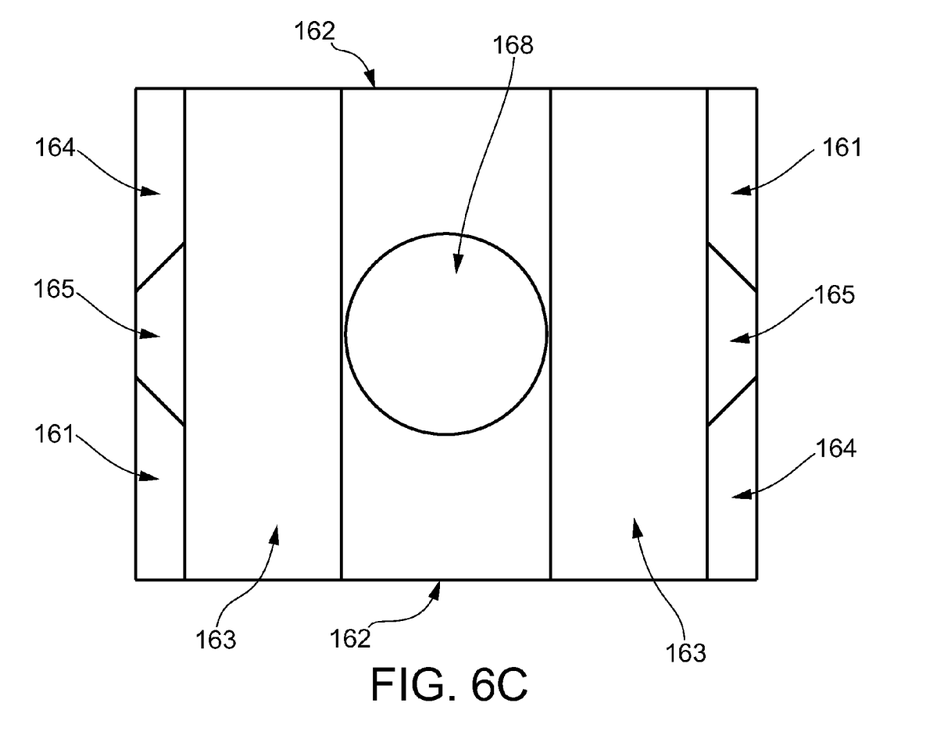
FIGS. 6C and 6D are top and side views of the cable clamp body of a two-piece embodiment of the present invention capable of 45° angle, parallel, and perpendicular orientations.
Figure 6D:
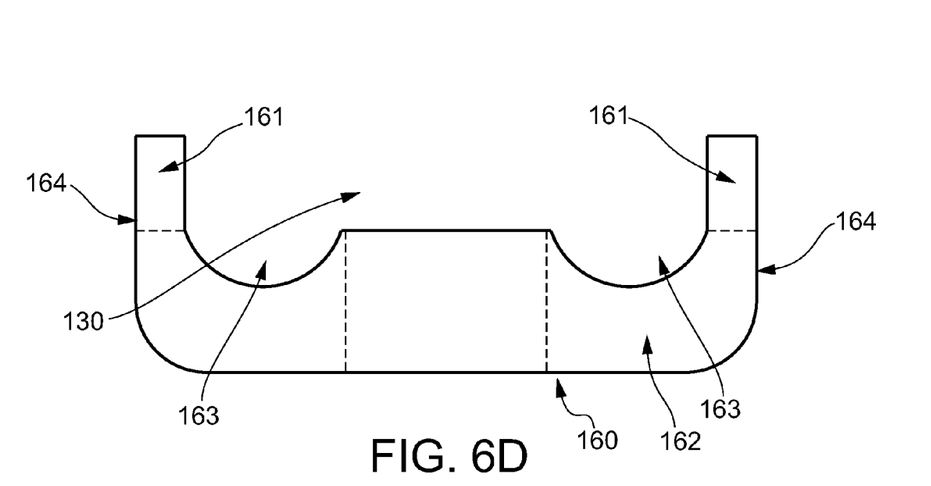
Figure 7:
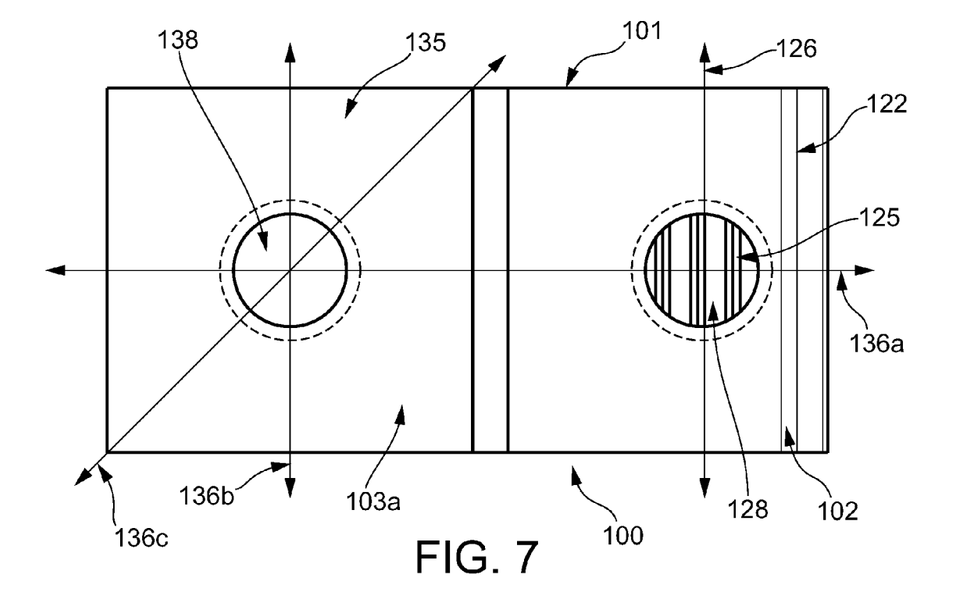
FIG. 7 illustrates the directional orientation feature of a two-piece embodiment of the present invention capable of 45° angle, parallel, and perpendicular orientations.
Figure 8A:
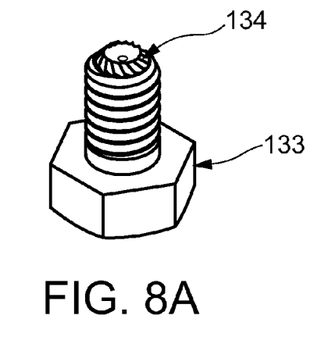
FIGS. 8A, 8B, 8C, and 8D show various views (perspective, sides, and top) of a knurled tip hex bolt fastener.
Figure 8B:
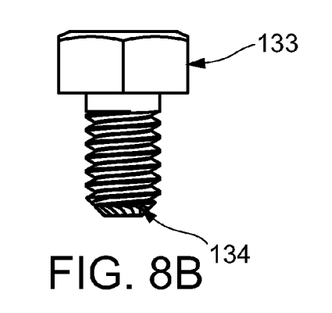
Figure 8C:
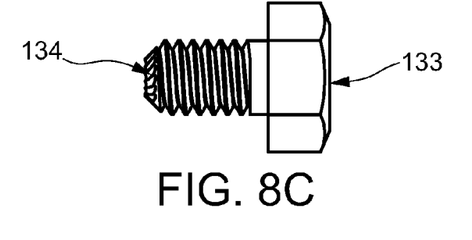
Figure 8D:
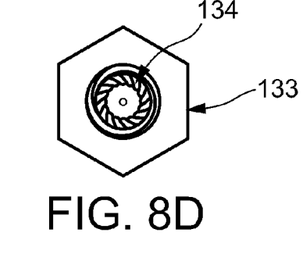

The cable clamp body 160 of this embodiment also has four sides 161, 162. Two sides are open sides 162 from which the parallel oriented directional cable grooves 163 run perpendicular. The other two sides 161 form protruding arms 164 designed to engage the electrical connector body cable clamp area portion 103a to secure the orientation of the grounding conductor 50 within cable clamp area opening 130. The cable clamp body 160 can be oriented about the electrical connector body cable clamp area portion 103a around an axis defined by the associated cable clamp area fastener in order to differentially orient the frame and grounding conductor 50 to be approximately perpendicular (FIGS. 4A, 5, 6A, & 7) or approximately parallel (FIGS. 5 & 7). In other embodiments, cable clamp body 160 includes v-cut notches 165 in protruding arms 164 of sides 161, which allows for an approximately 45° angle orientation (FIGS. 6B & 7).

The frame clamp area opening 120 and grounding conductor area opening 130 (as further defined by the open sides 162 of the cable clamp body 160) are positioned on the electrical connector 100 such that a line defined by a frame substrate 126 and a line defined by a grounding conductor 136a, 136b, and 136c are approximately perpendicular, parallel, or angled at 45° to one another, respectively. This can be further visualized in FIGS. 5 and 7.

Figure 9:
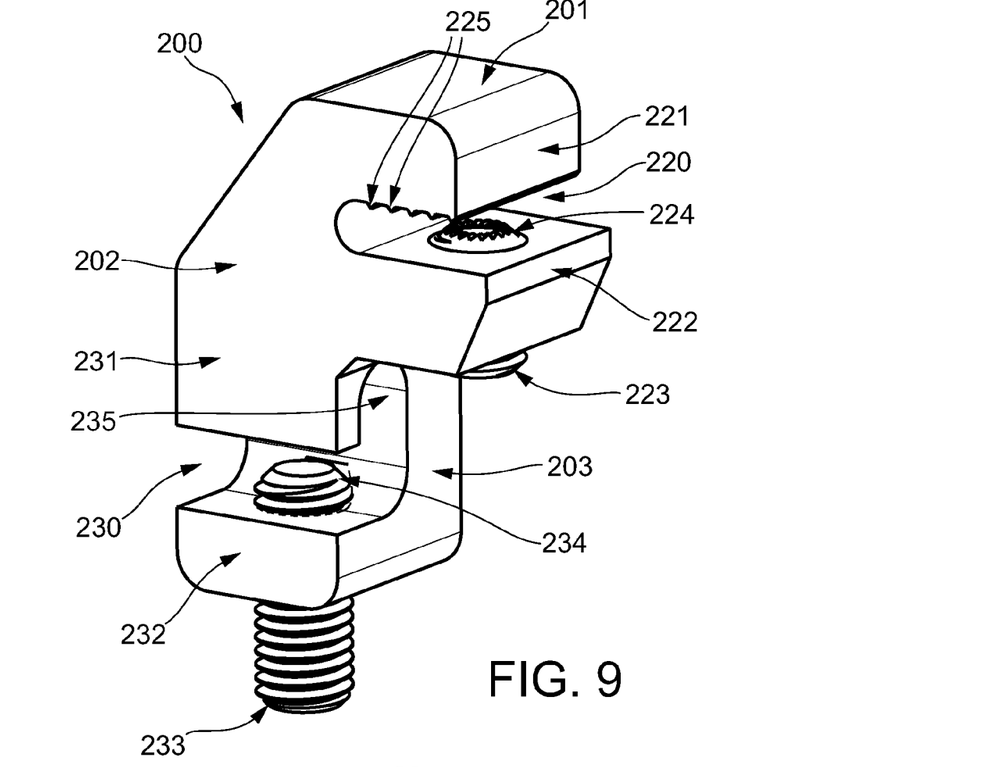
FIG. 9 is a perspective view of another embodiment of a PV system or cable tray system electrical connector with opening areas for engaging a frame substrate and a grounding conductor substrate.
Figure 10:
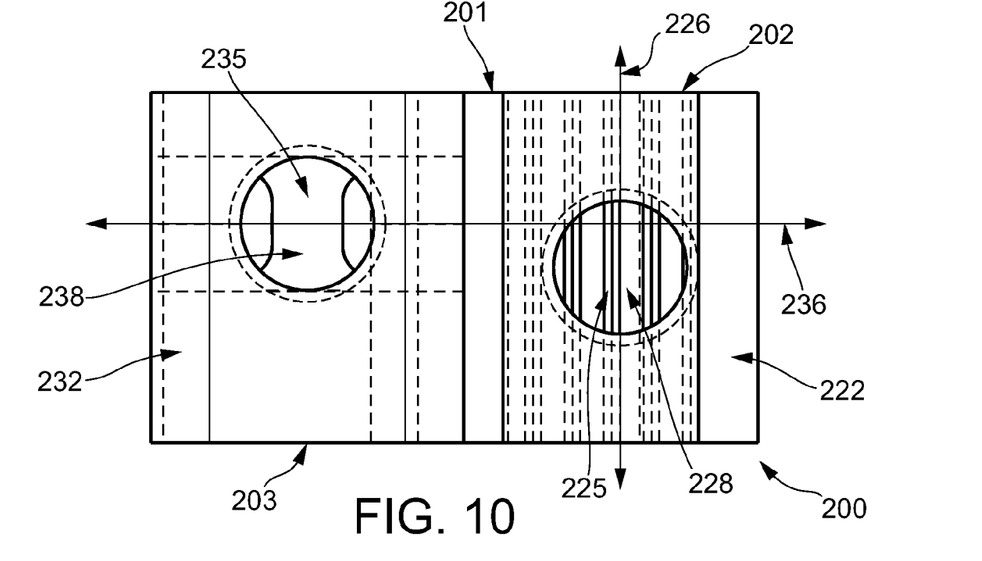
FIG. 10 illustrates the perpendicular orientation feature of the embodiment shown in FIG. 9 of the present invention.

FIGS. 9 and 10 illustrate another embodiment of the present invention. For example, FIG. 9 illustrates an embodiment of the electrical connector 200 of the present invention. The electrical connector 200 comprises a one piece electrical connector body 201 preferably formed from extruded aluminum or a conductive aluminum alloy. The electrical connector body 201 of this embodiment is extruded to form one of two clamp areas (the frame clamp area 202 in this embodiment) and machined to form the other clamp area (the grounding conductor clamp area 203 in this embodiment). Each clamp area 202, 203 is machined to form threaded holes 228, 238 for threadably coupled fasteners 223, 233, respectively (see FIG. 10).

The frame clamp area 202 comprises a frame clamp area opening 220 (defined by an upper arm 221 and lower arm 222), associated frame clamp area fastener 223 (a hex drive stainless steel set screw with knurled tip 224 in this embodiment, but flat point tip set screws may also be used, especially if the framing substrate has no protective coating or the coating has or will be removed at the mounting location), and serrated surface 225 on the interior of the frame clamp area opening 220 opposite from the side of the associated knurled tip 224 frame clamp area fastener 223. A flat panel aluminum frame of a PV module 40 (see FIG. 3A; or other suitable frame substrate to be clamped, e.g., a cable tray component) can be inserted into the frame clamp area opening 220 of the frame clamp area 202, in which it will be mechanically bonded to the electrical connector 200 by engaging the associated frame clamp area fastener 223. The serrated interior surface 225 of frame clamp area opening 220 serves at least two purposes in this embodiment. First, the serrations aid in holding the electrical connector 200 to the frame substrate prior to mechanical bonding. Second, the serrations may penetrate any protective coating (typically an anodized coating on the aluminum frames of PV modules 40, mounting racks, and mounting frames, and typically paint, galvanized coating, or similar on cable tray components) of the frame substrate during mechanical bonding. Furthermore, the knurled tip 224 of the associated frame clamp area fastener 223 penetrates into any protective coating of the frame substrate during mechanical bonding and aids in holding the frame substrate securely in various environmental conditions.

The grounding conductor clamp area 203 comprises a grounding conductor clamp area opening 230 (defined by an upper arm 231 and lower arm 232), associated grounding conductor clamp area fastener 233 (a hex drive stainless steel set screw with flat point tip 234 in this embodiment, but knurled tip fasteners may also be used, especially if the grounding conductor 50 (see FIG. 3B) has a protective coating at the connecting location), and smooth surface 235 on the interior of the grounding conductor clamp area opening 230 opposite from the side of the associated flat point tip 234 grounding conductor clamp area fastener 233. A grounding conductor 50 (typically a bare copper or conductive copper alloy wire) can be inserted into the grounding conductor clamp area opening 230 of the grounding conductor clamp area 203, in which it will be mechanically bonded to the electrical connector 200 by engaging the associated grounding conductor clamp area fastener 233. Grounding conductor clamp area opening 230 has an elongated oval area for seating a grounding conductor 50 closer to frame clamp area 202. To accommodate the increased the grounding conductor seating area within grounding conductor clamp area 203 the outer lip on upper arm 231 is lengthened accordingly. To facilitate connecting the grounding conductor 50, the lip on lower arm 232 is removed. As a result, the machining of grounding conductor clamp area opening 230 is more efficient than the embodiment shown in FIGS. 1-3, decreasing manufacturing costs and time.

The frame clamp area opening 220 and grounding conductor area opening 230 are positioned on the electrical connector body 201 such that a line defined by a frame substrate 226 and a line defined by a grounding conductor 236 are approximately perpendicular to one another. This can be further visualized in FIG. 10.

The terms "comprising" and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. An electrical connector comprising:
   (a) an electrical connector body;
   (b) a cable clamp body;
   (c) a first clamp area formed in said electrical connector body, wherein said first clamp area is capable of electrical connection with a frame substrate;
   (d) a second clamp area formed by coupling said electrical connector body and said cable clamp body, wherein said second clamp area is capable of electrical connection with a grounding conductor;
   (e) a first fastener coupled to said electrical connector body, wherein said first fastener is configured to secure the frame substrate in said first clamp area; and
   (f) a second fastener capable of coupling said electrical connector body and said cable clamp body, wherein said second fastener secures said grounding conductor in said second clamp area;
   wherein said grounding conductor may be seated in said second clamp area in one of a plurality of orientations about an axis defined by said second fastener.

2. The electrical connector of claim 1, wherein said electrical connector body and said cable clamp body are formed from aluminum, a conductive aluminum alloy, tin-plated copper, or a tin-plated conductive copper alloy.

3. The electrical connector of claim 1, wherein said first clamp area is formed with a plurality of serrations oriented opposite from said first fastener.

4. The electrical connector of claim 3, wherein said first fastener is threadably coupled to said electrical connector body, and said second fastener is threadably coupled to said electrical connector body and said cable clamp body.

5. The electrical connector of claim 3, wherein said first fastener has a knurled tip capable of physically bonding with the frame substrate.

6. The electrical connector of claim 1, wherein said cable clamp body has raised arm members on two sides opposite from each other for securing said cable clamp body to said electrical connector body in a fixed orientation.

7. The electrical connector of claim 6, wherein said fixed orientation secures said grounding conductor in approximately parallel orientation to the electrical connection with the frame substrate.

8. The electrical connector of claim 6, wherein said fixed orientation secures said grounding conductor in approximately perpendicular orientation to the electrical connection with the frame substrate.

9. The electrical connector of claim 6, wherein said fixed orientation secures said grounding conductor in approximately a 45° angle orientation to the electrical connection with the frame substrate.

10. An electrical connector for electrically connecting a photovoltaic module in a photovoltaic system having a plurality of photovoltaic modules to a grounding conductor in electrical connection with each of the photovoltaic modules in a photovoltaic system, the electrical connector comprising:
    (a) an electrical connector body;
    (b) a first and a second clamp area formed in said electrical connector body, wherein said electrical connector body is in electrical contact with an edge of an associated photovoltaic module in said first clamp area and said electrical connector body is in electrical contact with said grounding conductor in said second clamp area, wherein said first and said second clamp areas are oriented on said electrical connector body such that said edge of the associated photovoltaic module and said grounding conductor form geometric lines that run approximately perpendicular to one another; and (c) a first and a second fastener coupled to said electrical connector body, wherein said first fastener secures said edge of the associated photovoltaic module in said first clamp area and said second fastener secures said grounding conductor in said second clamp area.

11. The electrical connector of claim 10, wherein said electrical connector body is formed from aluminum or a conductive aluminum alloy.

12. The electrical connector of claim 10, wherein said first clamp area is formed with a plurality of serrations oriented opposite from said first fastener.

13. The electrical connector of claim 12, wherein said first and second fasteners are stainless steel set screws.

14. The electrical connector of claim 13, wherein said first fastener has a knurled tip capable of physically bonding with said edge of the associated photovoltaic module.

15. The electrical connector of claim 10, wherein said edge of the associated photovoltaic module is a long edge of the associated photovoltaic module.

16. An electrical connector for electrically connecting a photovoltaic module in a photovoltaic system having a plurality of photovoltaic modules to a grounding conductor in electrical connection with each of the photovoltaic modules in a photovoltaic system, the electrical connector comprising:

(a) an electrical connector body;

(b) a first and a second clamp area formed in said electrical connector body, wherein said electrical connector body is capable of electrical contact with an edge of an associated photovoltaic module in said first clamp area and said electrical connector body is capable of electrical contact with said grounding conductor in said second clamp area, wherein said first and said second clamp areas are oriented on said electrical connector body such that said edge of the associated photovoltaic module and said grounding conductor form geometric lines that run approximately perpendicular to one another; and (c) a first and a second fastener coupled to said electrical connector body, wherein said first fastener is capable of securing said edge of the associated photovoltaic module in said first clamp area and said second fastener is capable of securing said grounding conductor in said second clamp area.

17. The electrical connector of claim 16, wherein said electrical connector body is formed from aluminum or a conductive aluminum alloy.

18. The electrical connector of claim 16, wherein said first clamp area is formed with a plurality of serrations oriented opposite from said first fastener.

19. The electrical connector of claim 18, wherein said first and second fasteners are stainless steel set screws.

20. The electrical connector of claim 19, wherein said first and second fasteners have a knurled tip capable of physically bonding with said edge of the associated photovoltaic module.

21. The electrical connector of claim 16, wherein said edge of the associated photovoltaic module is a long edge of the associated photovoltaic module.

22. A photovoltaic system comprising:

(a) a plurality of photovoltaic modules each having an edge capable of electrical conduction;

(b) a grounding conductor; and (c) a plurality of electrical connectors each in electrical contact to one of said photovoltaic modules and to said grounding conductor, wherein at least one of the electrical connectors further comprises:

(i) an electrical connector body;

(ii) a first and a second clamp area formed in said electrical connector body, wherein said electrical connector body is in electrical contact with said edge of an associated photovoltaic module in said first clamp area, and said electrical connector body is in electrical contact with said grounding conductor in said second clamp area, wherein said first and said second clamp areas are oriented on said electrical connector body such that said edge of the associated photovoltaic module and said grounding conductor form geometric lines that run approximately perpendicular to one another; and (iii) a first and a second fastener coupled to said electrical connector body, wherein said first fastener secures said edge of the associated photovoltaic module in said first clamp area and said second fastener secures said grounding conductor in said second clamp area.

23. The photovoltaic system of claim 22, wherein said electrical connector body is formed from aluminum or a conductive aluminum alloy.

24. The photovoltaic system of claim 23, wherein said first and second fasteners are stainless steel set screws.

25. The photovoltaic system of claim 24, wherein said first fastener and second fasteners have a knurled tip capable of physically bonding with said edge of the associated photovoltaic module.

26. The electrical connector of claim 22, wherein said edge of the associated photovoltaic module is a long edge of the associated photovoltaic module.

* * * * *